Patented Mar. 15, 1927.

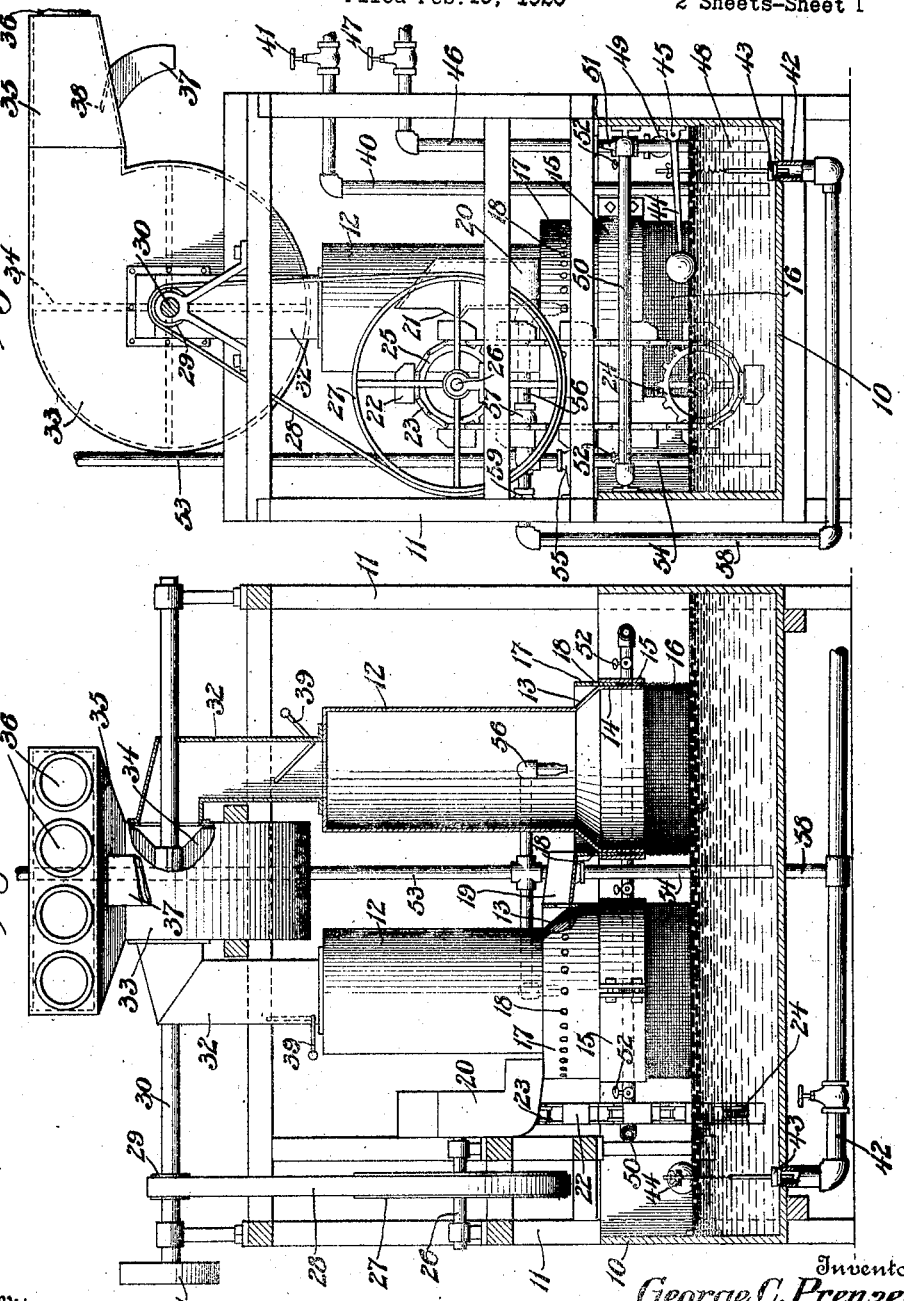

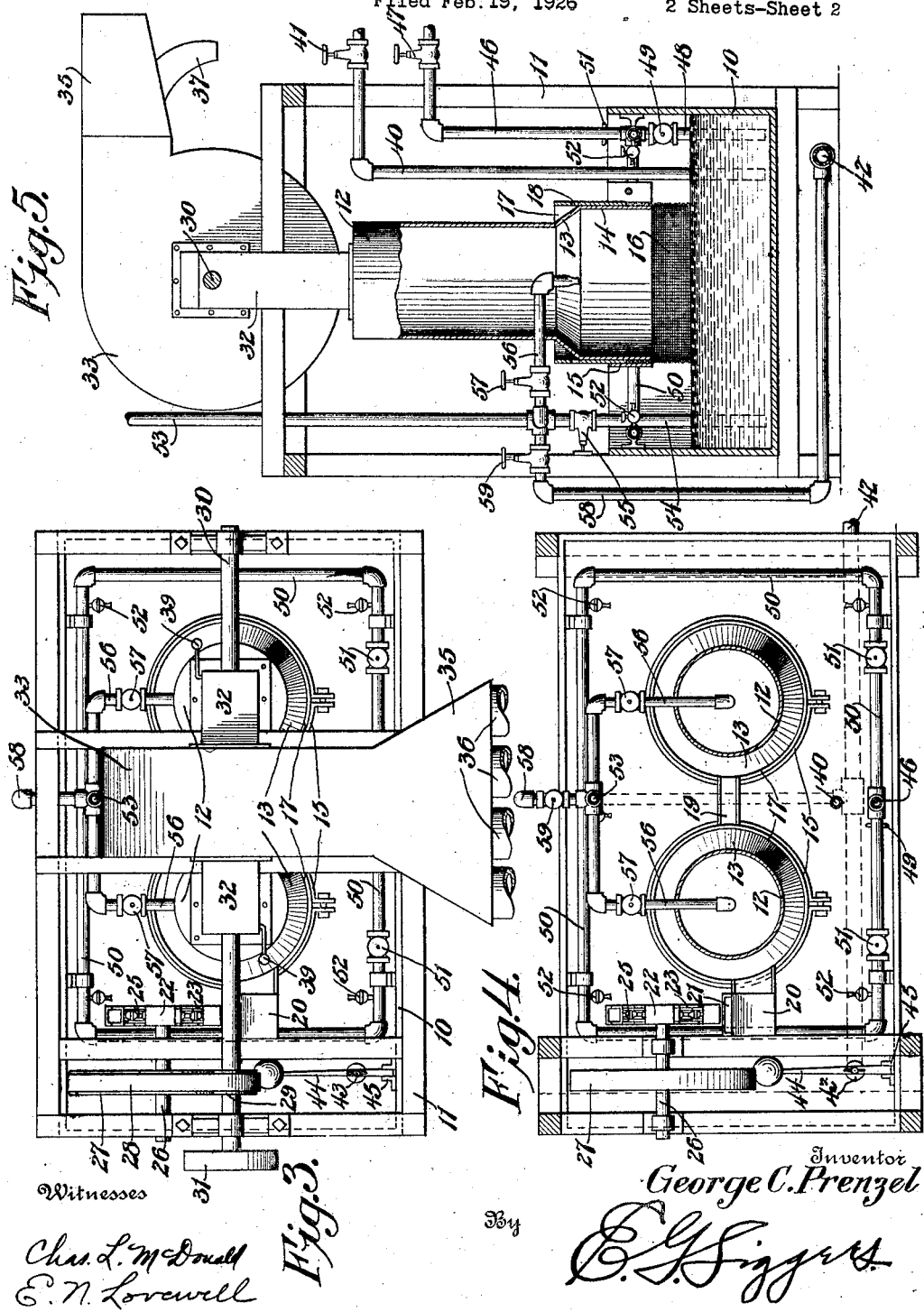

1,620,738

UNITED STATES PATENT OFFICE.

GEORGE CRIST PRENZEL, OF COLUMBIA, TENNESSEE.

AIR-MOISTENING DEVICE.

Application filed February 19, 1926. Serial No. 89,397.

This invention relates to a device for moistening the air in the different rooms of a building, and is of special importance in a mill where wheat and other grains are ground.

The object of the invention is to provide improved means for moistening a continuous stream of air, and for supplying the same to the different floors of the building, unmixed with dust or other impurities, so that the grain may be properly tempered, and maintained in that state until it is ground. Provision is also made for cooling the air in summer, and for warming the same in winter, so that substantially uniform conditions are maintained at all times.

The specific construction by which the desired object is attained, and the principles governing the operation of the invention will be more fully explained in the following detailed description, which is to be considered in connection with the accompanying drawings illustrating the same.

In the drawings:

Figure 1 is a vertical sectional view of the invention.

Figure 2 is a side elevation thereof.

Figure 3 is a plan view.

Figure 4 is a horizontal section.

Figure 5 is a vertical section taken at right angles to the plane of Figure 1.

In carrying out the invention, a receptacle 10 is provided, which is adapted to contain water. This receptacle is located preferably in the basement of the building, and is supported by a suitable framework 11. A vertical cylindrical casing 12, or preferably a plurality of such casings, are supported above the receptacle 10. Each of these casings is made, preferably, from galvanized sheet iron, and is formed at its lower end with an outwardly sloping shoulder 13, terminating in a comparatively large cylindrical portion 14. A clamping band 15, or equivalent device, surrounds the cylindrical portion 14, and serves to secure a downwardly extending cylindrical screen 16 and an upwardly extending collar 17. Each collar 17 is provided above the shoulder 13 with a series of ports 18, through which water may pass and dribble downwardly over the screen 16. Where two cylinders are used, the shoulder 13 on one is somewhat lower than the corresponding shoulder on the other, and a portion of the water which is supplied to the higher one passes through a spout 19 leading to the lower one, so that a suitable quantity of water is supplied to both screens.

Water is supplied to the higher collar 17 through a spout 20 located at one side of the cylinder, and having an inlet mouth 21 into which the water is poured from a series of cups 22 carried by a chain 23. This chain passes around a lower sprocket wheel 24, partly immersed in the water contained in the receptacle 10, and over an upper sprocket wheel 25, which is secured to a shaft 26 mounted in suitable bearings on the framework 11. The sprocket wheel 25 and chain 23 are driven by a comparatively large pulley 27 secured to the shaft 26, and driven by a belt 28 from a small pulley 29 secured to a shaft 30 journaled in suitable bearings at the top of the framework 11. The shaft 30 is provided with a drive pulley 31, which may be connected to any suitable source of power.

The cylinders 12 are secured at their upper ends to air conduits 32, which lead to a fan casing 33. The shaft 30 passes through the fan casing, and has a fan 34 secured thereto within said casing. The outlet 35, leading from the fan casing 33, is gradually reduced in height and widened, and is connected with a plurality of air conduits 36 leading to different floors or rooms in the building. It is preferred also to provide the outlet mouth 35 with a downwardly directed branch 37 controlled by an adjustable damper 38, so that a portion of the moistened air may be returned to the room in which the moistening device is located.

The screens 16 extend downwardly to or beneath the surface of the water within the receptacle 10, so that all of the air which is drawn in by the fan 34 must pass through the screens, and will be thoroughly moistened, and all dust and other impurities will be removed therefrom. The level of the water may be varied so as to regulate the flow of air toward the fan, and this flow may be further regulated by dampers 39 located within the conduits 32.

In the summer time cold water will be maintained in the receptacle 10, so that the air supplied by the device will be not only moistened but cooled, and in the winter time, the water may be warmed, so as to supply warm air. It will be seen, therefore, that by properly regulating the temperature of the water in the receptacle 10, the humidity and the temperature of the rooms may be kept uniform throughout the year.

The necessary amount of cold water may be supplied to the receptacle 10 by means of a water pipe 40, which is connected to the water main and provided with a suitable valve 41. When a sufficient amount of water has been admitted to the receptacle, it may be used over and over again until it becomes dirty, or until it has been lowered by evaporation sufficiently to require more water to be added. If sufficient water is available, however, a continuous stream may be allowed to flow into the tank, while all excess water is discharged through a drain pipe 42 leading from the bottom of the tank. The inlet to this drain pipe is controlled by a valve 43 connected with a float arm 44, which is hinged to the bracket 45 secured to the side of the receptacle. The connection between the float arm and the valve may be regulated, so as to cause the valve to open when the water reaches the proper level.

In order to heat the water in winter, a pipe 46 is connected with the steam heating apparatus, and is adapted to supply live steam. A main control valve 47 is provided in the pipe 46. This pipe is preferably provided with a branch 48 leading to the bottom of the tank, and controlled by an individual valve 49, and also another branch 50 extending around the inside of the receptacle near the top thereof, and provided with valves 51, and with inwardly directed steam jets 52.

The drainage from the steam radiators in the building may also be directed into a pipe 53, which has one branch 54 leading to the bottom of the water receptacle and controlled by a valve 55, and another branch 56 leading into the cylinder 12 and controlled by a valve 57. The pipe 53 also has another branch 58 leading to the drain pipe 42 and controlled by a valve 59.

From the foregoing description, it will be seen that I have provided a convenient and inexpensive device for moistening the air and regulating the temperature thereof, so that it may be cooled in summer and warmed in winter. In fact, the temperature throughout the building, as well as the humidity, may be constantly maintained at the same point both summer and winter. The device is of inestimable value in flour mills, since the wheat may be maintained uniformly in the proper condition for milling in spite of any change which may take place in the weather.

While I have shown and described in detail what appears to be the preferred embodiment of the invention, it is, of course, apparent that various modifications may be made in the structural arrangement without any material departure from the salient features of the invention as expressed in the claims.

What is claimed is:

1. In a device of the character described, the combination of a receptacle adapted to contain water, an upright casing supported above the bottom of the receptacle and open at its lower end, a screen secured to and surrounding the lower end of said casing and extending downwardly to the normal level of the water in the receptacle, a fan casing connected with the upper end of said upright casing and having conduits leading therefrom, a rotary fan in the fan casing operable to draw air through said screen into the fan casing and expel it through said conduits, a traveling chain with buckets extending into the water in the receptacle and driven by the fan shaft to lift water from said receptacle, and means for receiving water from the buckets and causing it to dribble over the screen to moisten the air which passes therethrough.

2. In a device of the character described, the combination of a receptacle adapted to contain water, an upright casing extending upwardly from within the receptacle and open at its lower end, a screen surrounding the lower end of said casing and extending downwardly to the normal level of the water within the receptacle, a collar secured to the casing above the screen with its upper portion spaced from the casing to form a trough around said casing, means for lifting water from the receptacle and discharging it into the trough, said collar having a series of holes from which the water dribbles over all parts of the screen, an air conduit leading from the upper end of the casing, and means for drawing air through the screen, casing and conduit, thereby moistening said air.

3. In a device of the character described, the combination of a receptacle adapted to contain water, an upright casing supported above the bottom of the receptacle and open at its lower end, a screen surrounding the lower end of said casing and extending downwardly to the normal level of the water in the receptacle, means for adding fresh water to the receptacle, a drain for the receptacle, means cooperating with the drain for maintaining the water in the receptacle at a constant level, means for raising water from the receptacle and discharging it so that it will dribble over the screen, an air conduit leading from the upper end of the casing, and means for drawing air through the screen casing and conduit, thereby moistening said air.

4. In a device of the character described, the combination of a receptacle adapted to contain water, an upright casing extending upwardly from within the receptacle and open at its lower end, a screen surrounding the lower end of said casing and extending downwardly to the normal level of the water in the receptacle, means for optionally introducing either live steam or spent steam from a steam heating apparatus into the water in the receptacle to warm the same, means for raising water from the receptacle and discharging it so as to dribble over the screen, an air conduit leading from the upper end of the casing, and means for drawing air through the screen, casing and conduit, thereby moistening said air.

5. In a device of the character described, the combination of a receptacle adapted to contain water, a plurality of upright casings supported above the bottom of the receptacle and open at their lower ends, screens secured to the lower ends of said casings and extending downwardly to the normal surface of the water, troughs surrounding the respective casings at different heights, means for lifting water from the receptacle and discharging it into the highest trough, a spout leading from the highest trough to a lower trough for conveying a portion of the water thereto, said troughs having holes from which water dribbles over all parts of the screens, conduits connected to the upper ends of the casings, and means for drawing air through the screens, casings and conduits, thereby moistening said air.

6. In a device of the character described, the combination of a receptacle adapted to contain water, two upright casings supported above the bottom of the receptacle and open at their lower ends, screens secured to the lower ends of said casings and extending downwardly to the normal surface of the water, troughs surrounding the respective casings at different heights, a spout leading from the higher trough to the lower trough, a fan casing supported above said upright casings, conduits connecting opposite sides of the fan casing to the upper ends of the respective upright casings, a rotary fan in the fan casing operable to draw air through said screeens, and means for lifting water and discharging it into the upper trough, whence a portion of it is discharged into the lower trough, said troughs having holes from which the water dribbles over the screens and moistens the air which is drawn therethrough by the fan.

7. In a device of the character described, the combination of a receptacle adapted to contain water, two upright casings supported above the bottom of the receptacle and open at their lower ends, screens secured to the lower ends of said casings and extending downwardly to the normal surface of the water, troughs surrounding the respective casings at different heights, a spout leading from the higher trough to the lower trough, a fan casing supported above said upright casings, conduits connecting opposite sides of the fan casing to the upper ends of the respective upright casings, a rotary fan in the fan casing operable to draw air through said screens, a traveling chain with buckets extending into the water in the receptacle and driven by the fan shaft, and means for receiving water from the buckets and discharging it into the higher trough, whence a portion of it is discharged into the lower trough, said troughs having holes from which the water dribbles over all parts of the screens to moisten the air which passes therethrough.

In testimony that I claim the foregoing as my own, I have hereto affixed my signature.

GEORGE CRIST PRENZEL.